A. D. PORTER.
PAPER LINED COOKING BASKET.
APPLICATION FILED MAY 28, 1912.
1,098,053.
Patented May 26, 1914.
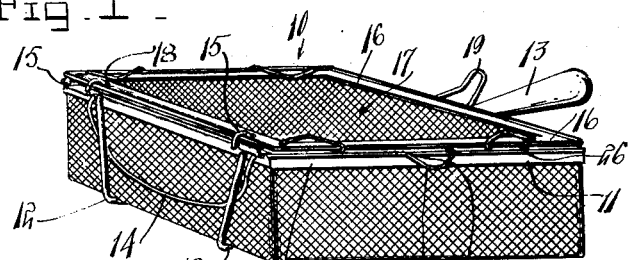
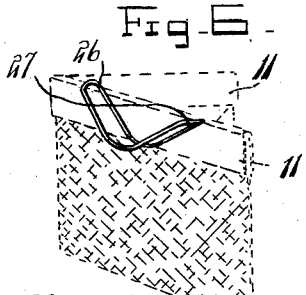
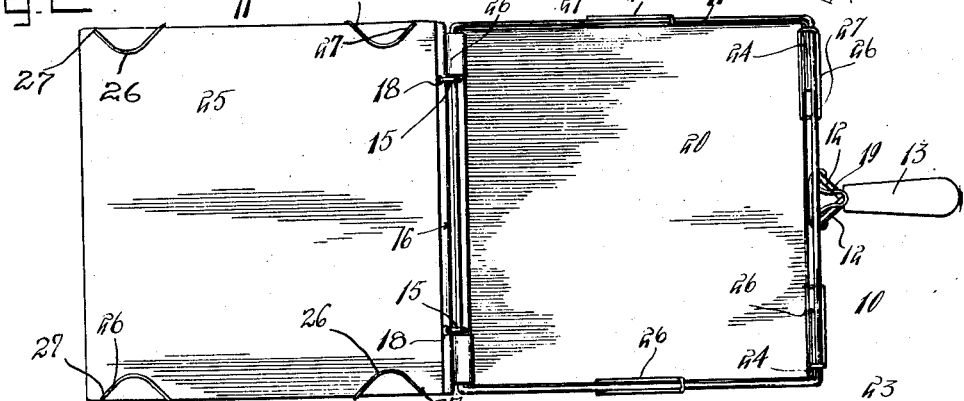
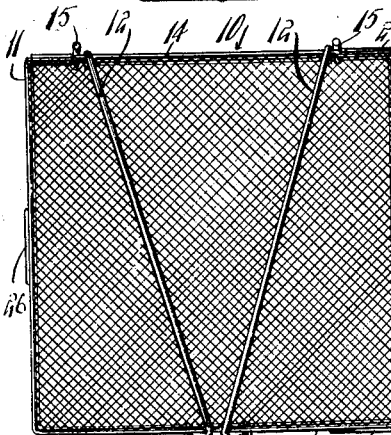
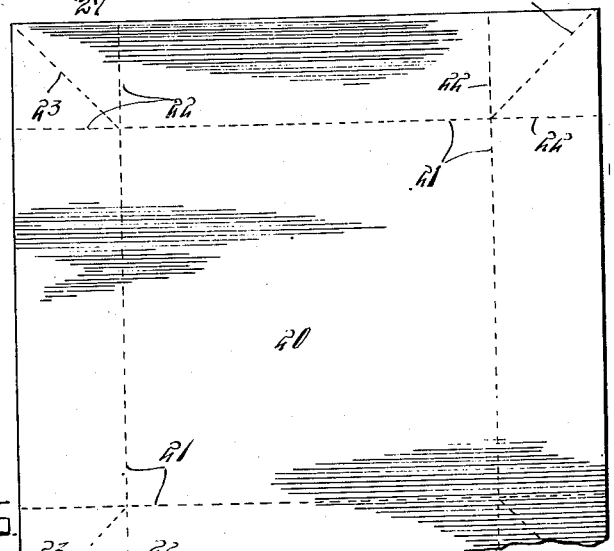
Inventor
A. D. Porter.

UNITED STATES PATENT OFFICE.

ALICE D. PORTER, OF BALDWIN, KANSAS.

PAPER-LINED COOKING-BASKET.

1,098,053.   Specification of Letters Patent.   Patented May 26, 1914.

Application filed May 28, 1912. Serial No. 700,229.

*To all whom it may concern:*

Be it known that I, ALICE D. PORTER, a citizen of the United States, residing at Baldwin, in the county of Douglas, State of Kansas, have invented certain new and useful Improvements in Paper-Lined Cooking-Baskets; and I do hereby declare the following to be a full, clear, and exact description of the invention, such as will enable others skilled in the art to which it appertains to make and use the same.

This invention consists in providing a cooking basket having a paper lining adapted for all manners of cooking food and essentially provided for obviating the necessity of washing cooking utensils and preventing injury to the hands as well as saving considerable time, trouble, labor and soap.

Another object of the invention is to provide a foraminous cooking basket having a removable and pivoted top and more especially to provide improved water proof and seamless linings of paper secured to the cover and within the basket by novel means permitting a renewal of the lining for each cooking operation and obviating the inconvenient manner of handling the ordinary cooking bag or utensil of metal and consequently obviating the unsanitary conditions necessary for the cleansing of said latter utensils.

A still further object of the invention is to provide an improved form of lining for the basket in which the same may be constructed from blank sections of material properly scored to be readily folded for being secured to the basket and lid thereof and adapted to lie flat when not in use so as to occupy very small space and permit a large supply at very little cost.

With the above and other objects in view, the invention consists of certain other combinations and arrangements of parts as will be hereinafter more fully described, claimed and illustrated in the accompanying drawings, in which:—

Figure 1 is a perspective view of my improved cooking basket. Fig. 2 is a top plan view thereof with the cover or lid open. Fig. 3 is a bottom plan view of the device. Fig. 4 is a longitudinal sectional view thereof. Fig. 5 is a detail view of a blank from which the lining of the basket is formed. Fig. 6 is a detail perspective view of a portion of the basket and a fastener employed for holding the lining in position.

As illustrated in the drawings, the numeral 10 indicates a rectangular foraminous receptacle or basket preferably formed of wire and having a surrounding binding of sheet metal at its edge portion as indicated at 11, while reinforcing wires 12 are secured to one end of the receptacle and extend in convergent relation along said end and bottom and converging at the other end for the attachment of a handle 13 for the convenient use of the receptacle.

The end portion to which the reinforcing wires 12 are secured is also provided with an arcuate wire member 14 terminating at its upper ends in open hooks 15 for the pivotal attachment to one end portion of a surrounding metallic binding 16 of a foraminous or wire mesh cover or lid 17, the binding 16 being provided with a pair of spaced apertures 18 for receiving the open hooks 15 so as to permit the cover to be readily attached or removed when desired and thus serve to permit the use of the basket with or without the lid as desired. The end of the receptacle adjacent to the handle is provided with a wire catch 19 to engage the free edge of the lid 17 and thus secure the same in a closed position while permitting the convenient disengagement of the lid for opening the same.

In the further embodiment of the invention, the basket is provided with a removable water proof paper lining 20, the same being of seamless construction and comprising a single blank section of paper having a central rectangular scored portion 21 conforming in size to the bottom of the basket, the said scored portions or side lines thereof extending to the edges of the lining 20 as shown at 22 while the corners of the lining from the points of intersection of the lines 21 are diagonally scored as shown at 23 so that the parts will fold along the lines 21 and then the corners of the lining will fold along the lines 22 and 23 to provide overlapped corner portions 24 to properly conform to the shape of the basket and reinforce the lining at the corners.

The lid of the receptacle is interiorly covered by a rectangular lining 25 which is of the same material as the lining 20 for the basket proper and it will thus be seen that the parts are constructed from sheet material and when not in use or previous to use will lie flat and permit the keeping of a large supply at a small cost and only occupying a small amount of space. In order to removably secure the linings in position, clips 26 are provided, the same comprising single sections of wire bound in substantially U-form and having a reduced extension 27 at one end abutting for pivotal attachment to the surrounding binding of the basket proper and the cover for movement toward and away from the same in attaching and removing the lining.

From the foregoing description in connection with the accompanying drawings, it will be seen that the cooking basket constructed in accordance with the foregoing disclosure will serve for convenient use in baking, broiling or frying, obviating the inconveniences above pointed out and apparent from the use of the ordinary paper bag or metallic utensils while the lining can be so cheaply constructed as to be thrown away after being used. The securing means for the linings also prevents the same from curling over the food while also holding the same closely against the basket and cover to hold in the flavor. The lid also opens at the front or side adjacent to the handle to permit inspection of the food at all times without turning the receptacle in the oven.

I claim:

The combination with a wire basket having a handle member and a lid of similar material pivotally and removably attached to the basket; of removable and separate paper linings for the interior of the said basket and lid and clasps for engaging the linings, basket and lid to hold the linings in position, said clasps comprising single sections of wire bent in substantially U-form and having extensions pivoted to the basket and lid respectively.

In testimony whereof, I affix my signature, in presence of two witnesses.

ALICE D. PORTER.

Witnesses:
ETHEL HUFF,
RUBY KERHONE.